Patented Feb. 9, 1926.

1,572,715

UNITED STATES PATENT OFFICE.

FRITZ GÜNTHER AND FRITZ LANGE, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

SOLID STABLE DIAZO COMPOUNDS.

No Drawing. Application filed July 22, 1924. Serial No. 727,522.

*To all whom it may concern*

Be it known that we, FRITZ GÜNTHER and FRITZ LANGE, citizens of the German Empire, residing at Ludwigshafen-on-the-Rhine, Germany, have invented new and useful Improvements in Solid Stable Diazo Compounds, of which the following is a specification.

We have found that solid diazo compounds of aromatic amines possessing excellent stability can be obtained by adding a compound of zinc to a solution of a diazotized aromatic carbocyclic amine which is free from azo groups (thus excluding diazotized amino azo compounds), while taking care that the solution contains sufficient chlorine ions to allow a double compound of zinc and diazonium chlorids to be formed. In many cases the addition of an alkali metal chlorid may prove suitable or necessary for precipitating the solid diazo compound. Such salts may also serve for supplying the chlorine ions required for the formation of the double compound aforementioned.

The solid diazo salts obtained can be dried at a moderate temperature and are distinguished by very good stability even under unfavorable conditions. An addition may be made to them of harmless soluble salts, such as calcined Glauber's salt, common salt, aluminium sulfate and so on, to further increase their stability and to counteract certain explosive properties which may exist.

The invention is further illustrated by the following examples to which, however, the invention is not limited. The parts are by weight.

*Example 1.*

17 parts of 1-amino-2-nitro-4-chlorobenzene are dissolved at the temperature of the water bath in 30 parts of sulfuric acid of 66 degrees Baumé whereupon the solution is poured into cold water while stirring. The solution is diazotized with nitrite solution in the usual manner at a low temperature, and 5 parts of zinc hydroxid and sufficient common salt are then added to precipitate the diazo compound. The latter is obtained as a nearly colorless substance. It is filtered off, mixed with say 50 parts of pulverized dehydrated Glauber's salt or pulverized aluminum sulfate and then dried in vacuo at a moderate temperature.

*Example 2.*

17 parts of 1-methoxy-2-amino-4-nitrobenzene are made into a paste with 55 parts of hydrochloric acid of 20 degrees Baumé whereupon ice is added and nitrite solution until the amino compound is diazotized. To the solution of the diazonium compound, the volume of which will amount to about 200 parts, are then added from 7 to 8 parts of zinc chlorid dissolved in a little water, whereby the zinc diazonium double compound is separated out in the form of a nearly colorless precipitate.

*Example 3.*

12 parts of ortho-dianisidine are dissolved in a hot mixture of 22 parts of sulfuric acid of 66 degrees Baumé and 60 parts of water. The solution is poured into ice and diazotized with nitrite solution in the usual manner whereupon the solid tetrazo compound can be obtained by adding 8 parts of zinc oxid and common salt.

Other aromatic amines which are free from azo groups, such as ortho-nitraniline, ortho-chloraniline, 1-amino-2-chlor-4-nitrobenzene, 1-amino-2-nitro-4-methyl benzene, 1-methoxy-2-amino-5-nitrobenzene can be converted into solid, stable, nearly uncolored diazo compounds in an analogous manner. Such amines as contain an electronegative substitute in ortho position relative to the amino group, give the best results as to stability of the solid diazo compound.

What we claim is:

1. Solid stable diazo compounds containing double chlorids only of zinc and of a diazonium compound and derived from an aromatic amine carbocyclic which is free from azo groups, which diazo compounds are soluble in water and directly react with the usual components of azo dyestuffs, for example beta-naphthol.

2. The process of manufacturing solid stable diazo compounds which consist in adding to the solution of a diazotized aromatic carbocyclic amine, which is free from azo groups, a compound of zinc, soluble in the diazonium solution while taking care that chlorine ions are present in sufficient quantity to allow a double compound of zinc and diazonium chlorid to be formed in the absence of compounds of other heavy metals.

3. The process of manufacturing solid stable diazo compounds which consists in adding to the solution of a diazotized aromatic carbocyclic amine, which is free from azo groups, a compound of zinc soluble in the diazonium solution, and an alkali metal chlorid sufficient to precipitate the diazo compound.

4. The process of manufacturing solid stable diazo compounds which consists in adding to the solution of a diazotized aromatic carbocyclic amine, which is free from azo groups, a compound of zinc soluble in the diazonium solution, and an alkali metal chlorid sufficient to precipitate the diazo compound, separating the solid diazo compound and adding to it a harmless solid soluble salt.

In testimony whereof we have hereunto set our hands.

FRITZ GÜNTHER.
FRITZ LANGE.